US008299362B2

(12) United States Patent
Vaughan

(10) Patent No.: US 8,299,362 B2
(45) Date of Patent: Oct. 30, 2012

(54) CABLE ADAPTER AND ADAPTED SYSTEM

(75) Inventor: James A Vaughan, Pahrump, NV (US)

(73) Assignee: Metis Holdings LLC, Roseau (DM)

( * ) Notice: Subject to any disclaimer, the term of this patent is extended or adjusted under 35 U.S.C. 154(b) by 0 days.

(21) Appl. No.: 12/977,732

(22) Filed: Dec. 23, 2010

(65) Prior Publication Data

US 2012/0164857 A1    Jun. 28, 2012

(51) Int. Cl.
*H01R 4/66* (2006.01)
(52) U.S. Cl. .......... 174/72 A; 174/68.1; 174/74; 174/78; 174/50; 439/92; 439/100
(58) Field of Classification Search .................. 174/5 R, 174/5 SG, 6, 40 CC, 51, 151, 68.1, 68.3, 174/71, 72, 72 A, 74, 78, 102–103; 361/826; 439/92, 93, 128, 105, 135, 892, 106, 607.42, 439/119; 248/49; 285/154.2
See application file for complete search history.

(56) References Cited

U.S. PATENT DOCUMENTS

| | | | |
|---|---|---|---|
| 2,569,223 A | | 9/1951 | Bowers |
| 2,835,723 A | | 5/1958 | Killian et al. |
| 3,005,037 A | | 10/1961 | Miller, Sr. |
| 3,052,748 A | | 9/1962 | Curtiss |
| 3,098,115 A | | 7/1963 | Guarnaschelli |
| 3,755,977 A | * | 9/1973 | Lewis ................................ 52/98 |
| 3,832,672 A | | 8/1974 | Loos |
| 3,935,637 A | * | 2/1976 | Bunnell .......................... 29/866 |
| 3,944,317 A | * | 3/1976 | Oberdiear ................ 439/607.47 |
| 4,382,653 A | * | 5/1983 | Blanchard ................ 439/607.41 |
| 4,503,203 A | * | 3/1985 | Golembeski et al. ......... 526/159 |
| 4,640,569 A | * | 2/1987 | Dola et al. ..................... 439/461 |
| 5,306,170 A | * | 4/1994 | Luu ................................ 439/100 |
| 5,364,281 A | | 11/1994 | Leto |
| 5,480,311 A | | 1/1996 | Luu |
| 5,558,539 A | * | 9/1996 | Lignelet ..................... 439/607.5 |
| 5,769,665 A | * | 6/1998 | Neely et al. .............. 439/607.41 |
| 5,888,097 A | * | 3/1999 | DiCicco ................... 439/607.44 |
| 6,022,231 A | | 2/2000 | Williams et al. |
| 6,176,711 B1 | | 1/2001 | Rohr et al. |
| 6,339,193 B1 | * | 1/2002 | Goett et al. ..................... 174/78 |
| 7,281,932 B2 | | 10/2007 | Cheng et al. |
| 7,878,868 B2 | * | 2/2011 | Mech et al. ................... 439/709 |

* cited by examiner

*Primary Examiner* — Angel R Estrada
*Assistant Examiner* — Dimary Lopez
(74) *Attorney, Agent, or Firm* — Gene Scott; Patent Law & Venture Group

(57) ABSTRACT

An electrical adapter enables the conductors of a flexible cable to be extended into an armored conduit with electrical ground continuity and a rigid structural attachment. The adapter is cylindrical and has removable cover over an oblique aperture providing a highly rigid and strengthened fixture, which has a ground wire clamp for securement of the wires of the cable. An adapter collar is secured rotationally to one end of the adapter body for connecting the adapter to a nipple of an armored conduit mounted to a wall structure. The ground wire is secured to the ground wire fixture, and with the adapter collar secured to the armored conduit, electrical ground continuity is extended from the flexible cable to the armored conduit. With the removable cover secured over the access aperture, exposure of the ground wire clamp and the conductors of the flexible cable is eliminated.

18 Claims, 2 Drawing Sheets

CABLE ADAPTER AND ADAPTED SYSTEM

BACKGROUND

This disclosure relates to electrical connectors and adapters and more particularly to an adapter for joining a run of a flexible cable into a continuing run protected by a rigid or flexible armored jacket. The prior art in this field includes methods and apparatus for attaching conduit to flexible sleeving, electrical metallic tube, coupling, and connector apparatus and methods, electrical pipe fitting with integral grounding fixtures, latch-free housings for electrical terminals, bonding flange adapters and grounding coupling for electrical wire raceways. However, although a need persists for a device that is able to easily and securely enable a flexible cable to be continued into an armored conduit with a reliable joint so that the cable is not likely to loosen, such a device is not known.

SUMMARY

Various types of adapters and other kinds of electrical fixtures are known in the prior art and are used by mechanics for practical installations of electrical conductors in buildings and in equipment and apparatus. A variety of electrical conductors and electrical conduits are also in general use. For instance, cable may be coaxial, mulicore, ribbon, shielded, stranded, single, twisted pair and twisted cable. For interior wiring, flexible cables are often used where a plurality of individual conductors, each having its own insulated outer wrap, are bundled within a flexible insulating outer sheath. Such cable is easily cut, stripped, bent around corners, and fed through holes in structures. Interior wiring may also have the same individual conductors carried within armored conduit, the later being more robust and, some types being immune to electric and magnetic fields and to the propagation of these fields. Such conduits may be of several types including: rigid metal, rigid nonmetallic, galvanized rigid, metallic tubing, nonmetallic tubing, flexible metallic, liquidtight flexible metal, flexible metallic tubing, liquidtight flexible nonmetallic, aluminum, intermediate metal, and PVC among others. There is frequently a need, for practical reasons or to meet building codes, for routing a flexible cable, or individual wires, through a conduit. In some of these instances, it is desired to dispense with the outer insulating sheath of a cable prior to routing the individual wires though conduit. In such cases, the presently described device is a highly useful fixture. To apply the presently described device, a multi-conductor cable is stripped of its outer sheath so that its individual wires are free including a bare ground wire. The device has opposing ends. The sheath is clamped at one of the ends of the device. The ground wire is secured under a screw within the device and then the insulated conductors and the ground wire are routed out of the opposing end of the device and into the conduit. The device has a fixture which mates securely with the armored conduit. One side of the device is open for access to secure the ground wire and to visualize the finished connection. The device's cover is placed over the open side of the device and may act as one half of the clamp for securing the flexible cable.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the drawings indicate like elements.

DETAILED DESCRIPTION

Figure 1:
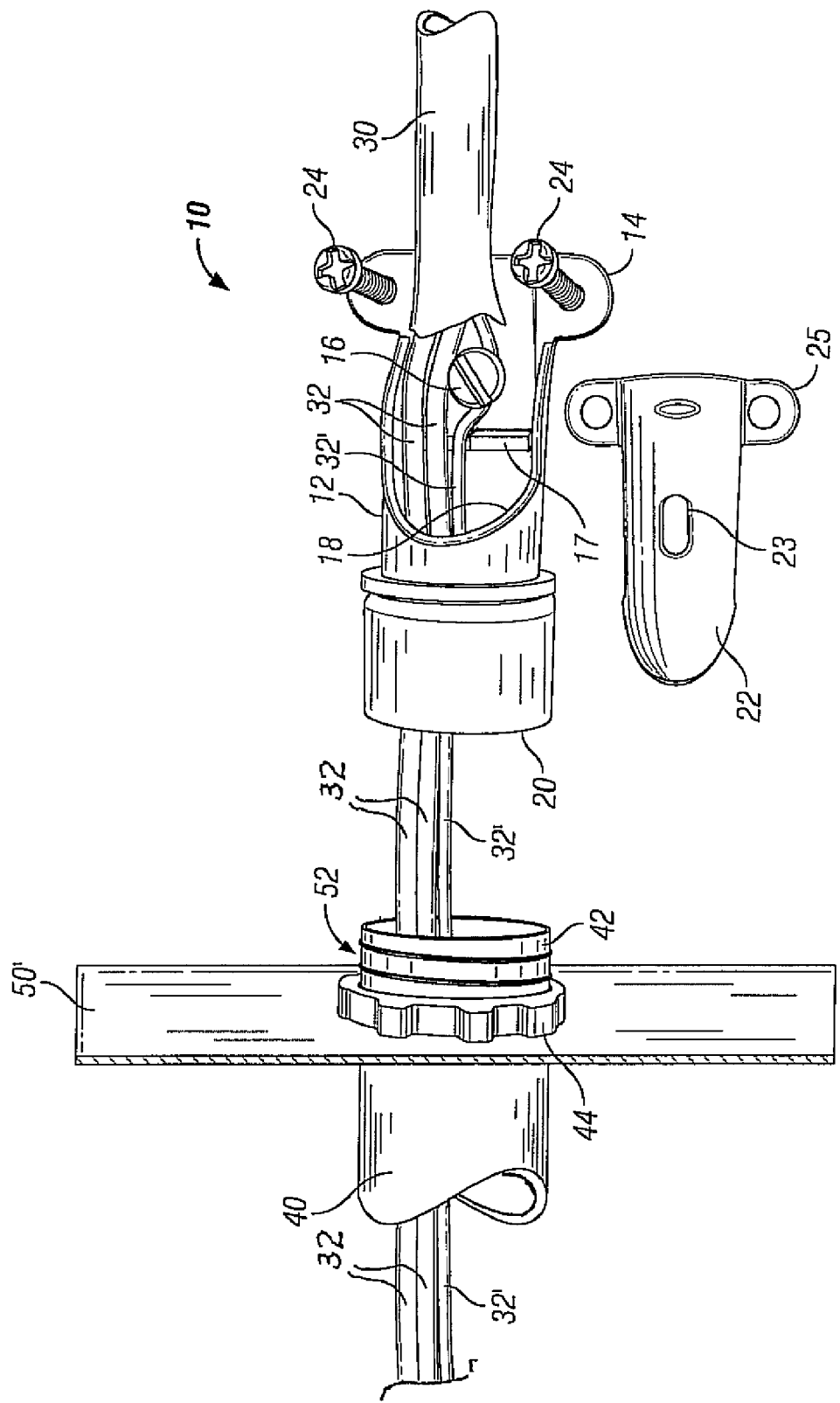
FIG. 1 is a perspective view of an example of the presently described adapter apparatus shown disengaged from a nipple of a armored conduit, and with an access cover removed to reveal wires and connections within the adapter.
Figure 2:
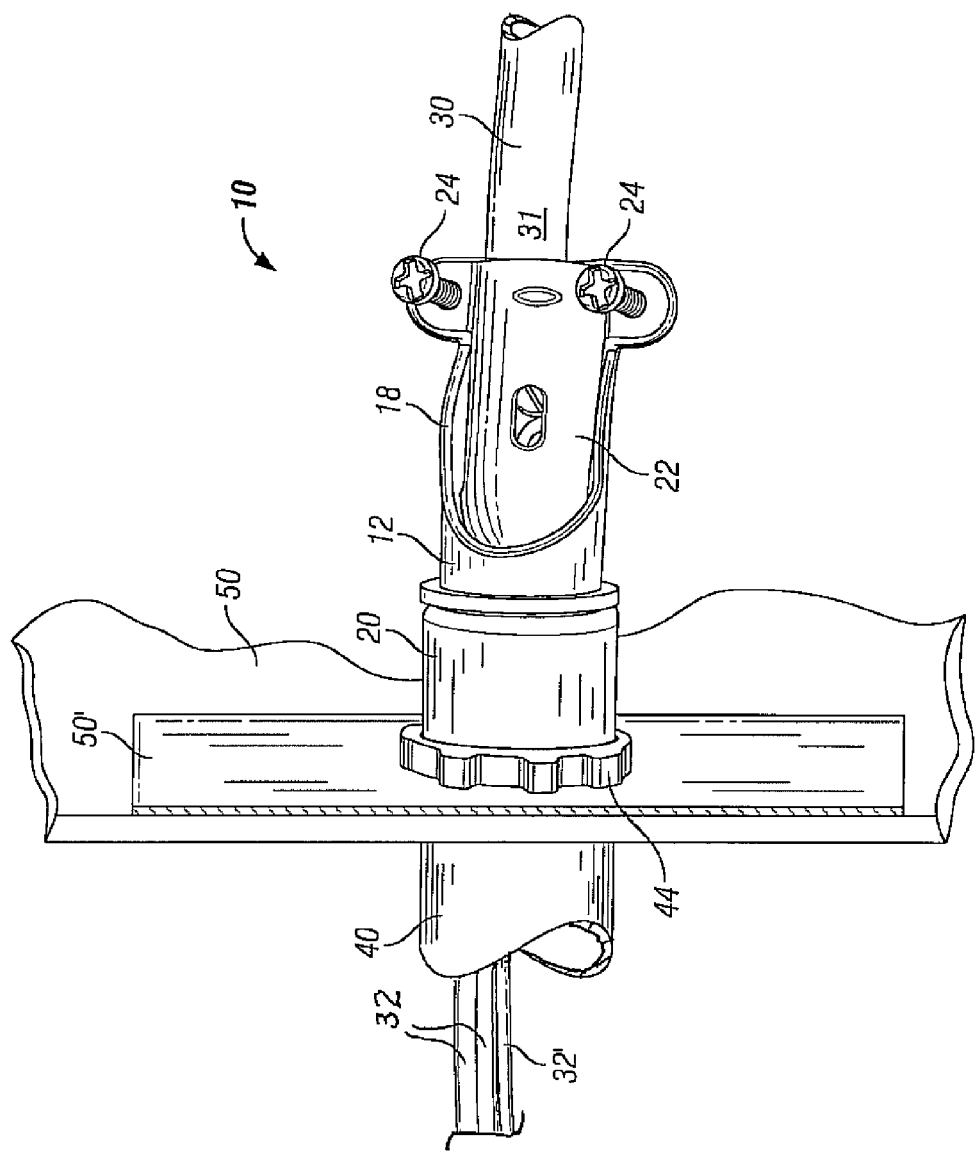
FIG. 2 is an example perspective view of the adapter apparatus engaged with the armored conduit and shown with its cover attached.

FIG. 1 illustrates, an adapter 10 for enabling electrical conductors 32 of a flexible cable 30 to be extended into an armored conduit 40 with electrical ground continuity and with the flexible cable securely held in place. Adapter 10 has a tubular adapter body 12 with an oblique aperture 18, a ground wire clamp 16, and a wire positioning abutment 17. Adapter 10 also has a ring collar 20 secured rotationally to the adapter body 12 and a curved adapter cover 22 with a cover fastener 24. With a ground wire 32' of the flexible cable 30 secured to the ground wire clamp 16, which is shown as a screw in FIG. 1, and with the ring collar 20 secured to a nipple 42 of the armored conduit 40 (FIG. 2), electrical ground continuity is extended from the flexible cable 30 to the armored conduit 40. With the adapter cover 22 secured over an oblique aperture 18 in the sidewall of adapter body 12, access to the ground wire 32' and ground wire clamp 16 and the conductors 32 of the flexible cable 30 that are positioned inside the adapter body 12 is not possible so that damage to them can be avoided. The adapter body 12 may be cylindrical as shown but may also be of other shapes, however the cylindrical shape is preferred as being more convenient in use and having a stronger structure so as not to be easily crushed or otherwise damaged in use. The adapter cover 22 may have a pair of ears 25 as shown. The ground wire clamp 16 may be a threaded fastener such as a screw as shown, and may include a wire positioning abutment 17 which is in such a position adjacent to the screw wire clamp 16 that it forces the ground wire 32' to be pushed up against, and secured within clamp 16. Abutment 17 is also in a position to act as a wire restraint resisting wire tension from within conduit 40. The ring collar 20 may be threaded and may be captured on body 12 in a manner permitting rotation so that it may be fastened to nipple 42. The cover fasteners 24 secure ears 25 to ears 14 as shown in FIG. 2, thereby securing cover 22 over aperture 18. The adapter cover 22 may have an inspection hole 23 positioned opposite ground wire clamp 16 when the adapter cover 22 is fastened in position on body 12.

In a second embodiment of the presently described apparatus, the above described adapter 10 is engaged with the flexible cable 30 and the armored conduit 40 as a complete solution to the objectives described in the above summary of this disclosure. In this version, an adaptive combination is applied for extending the electrical conductors 32, 32' from the flexible cable 30 to, and into, tire armored conduit 40 which is typically mounted on a supporting wall 50. As described above, the adapter 10 may have a body 12 with a rotationally secured adapter collar 20 mounted on one end of the body 12, and a removable cover 22, and a ground wire clamp 16. A protective outer jacket 31 of flexible cable 30 may terminate within the adapter body 12 near the ground wire clamp 16, and the ground wire 32' may be engaged with the ground wire clamp 16 and therefrom it may extend along with one or more insulated conductors 32 into the armored conduit 40 while the cable 30, at protective outer jacket 31, may be clamped between the adapter body 12 and the cover 22 using common fasteners 24 to join the first 14 and second 25 pairs of ears to effect clamping action on cable 30.

As illustrated in FIG. 2 the supporting wall 50 may have mounted to it a sheet metal plate 50', and wall 50 may be made of metal or similar structure made of any material whereby the armored conduit 40 may be mounted in a hole 52 therein and terminates with the externally threaded nipple 42 secured by a nut 44, i.e., a conventional mounting. The wall 50 may also be part of a standard building wall structure of wood or plaster board or other material. Having the ground wire 32' and the insulated conductor wires 32 of flexible cable 30 lying within armored conduit 40 provides an advantage in electrical wiring where parallel loads are to be wired from a single lead since no stripping of the outer flexible sheath need be prepared and the ground, hot, and neutral conductors may be stripped without severing them, so that they can be wrapped around load terminals and then continued station by station. This requires much less work and results in a cleaner and more durable arrangement.

A preferred embodiment has been described. Nevertheless, it will be understood that various modifications may be made without departing from the spirit and scope of this disclosure. Accordingly, other embodiments are within the scope of the following claims.

What is claimed is:

1. An adapter for enabling conductors of a flexible cable to be extended into an armored conduit with electrical ground continuity, the adapter comprising:
   a tubular adapter body having an oblique aperture on one side thereof, the aperture enabling access to an interior surface of the adapter body, a ground wire clamp secured to the interior surface thereby establishing electrical continuity therewith, and at one end of the adapter body a first cover fastener;
   a ring collar rotationally secured to a second end of the adapter body;
   a curved adapter cover having an oblique edge corresponding to the oblique aperture of the adapter body and a second cover fastener;
   whereby, with a ground wire of the flexible cable secured to the ground wire clamp, and with the ring collar secured to a nipple of the armored conduit, electrical ground continuity is established between the ground wire of the flexible cable and the armored conduit.

2. The adapter of claim 1 wherein the first and the second cover fasteners are ears extending laterally therefrom.

3. The adapter of claim 1 wherein the ground wire clamp is a threaded fastener.

4. The adapter of claim 1 wherein the ground wire clamp includes a wire positioning abutment secured to the interior surface.

5. The adapter of claim 1 wherein the ring collar is an internally threaded cylindrical ring.

6. The adapter of claim 1 wherein with the adapter cover secured over the access aperture, the access aperture is fully closed.

7. The adapter of claim 4 wherein the wire positioning abutment is positioned to force the ground wire to at least partially circumvent the threaded fastener when the ground wire extends between the ends of the adapter.

8. The adapter of claim 1 wherein the adapter cover has an inspection hole positioned opposite the ground wire clamp when the adapter cover is secured to the adapter body.

9. A combination of an armored conduit and an adapter for enabling conductors of a flexible cable to be extended into the armored conduit with electrical ground continuity, the combination comprising:
   a tubular armored conduit having a threaded nipple at one end thereof;
   a tubular adapter body having an oblique aperture on one side thereof, the aperture enabling access to an interior surface of the adapter body, a ground wire clamp secured to the interior surface thereby establishing electrical continuity therewith, and at one end of the adapter body a first cover fastener;
   a ring collar rotationally secured to a second end of the adapter body and threadedly secured to the threaded nipple of the armored conduit;
   a curved adapter cover having an oblique edge corresponding to the oblique aperture of the adapter body and a second cover fastener;
   whereby, with a ground wire of the flexible cable secured to the ground wire clamp, electrical ground continuity is established between the ground wire of the flexible cable and the armored conduit.

10. The combination of claim 9 wherein the first and the second cover fasteners are ears extending laterally therefrom.

11. The combination of claim 9 wherein the ground wire clamp is a threaded fastener.

12. The combination of claim 9 wherein the ground wire clamp includes a wire positioning abutment secured to the interior surface.

13. The combination of claim 9 wherein the ring collar is an internally threaded cylindrical ring.

14. The combination of claim 9 wherein with the adapter cover secured over the access aperture, the access aperture is fully closed.

15. The combination of claim 12 wherein the wire positioning abutment is positioned to force the ground wire to at least partially circumvent the threaded fastener when the ground wire extends between the ends of the adapter.

16. The combination of claim 9 wherein the adapter cover has an inspection hole positioned opposite the ground wire clamp when the adapter cover is secured to the adapter body.

17. An adapter for enabling a ground wire of a flexible cable to be secured and to establish electrical continuity with a rigid armored cable sheath, the adapter comprising:
   an adapter body having an oblique aperture on one side thereof, the aperture enabling access to a portion of an interior of the adapter body, a ground wire clamp secured within the adapter body and having electrical continuity therewith;
   an attachment element rotationally secured to the adapter body;
   a cover having an oblique edge corresponding to the oblique aperture of the adapter body for covering the aperture; and
   the flexible cable extending through the adapter body with the ground wire secured to the ground wire clamp.

18. The adapter of claim 17 wherein the attachment element is engaged with the armored cable sheath thereby establishing ground continuity between the flexible cable and the armored cable sheath.

* * * * *